(12) United States Patent
Matthaei et al.

(10) Patent No.: US 12,423,989 B2
(45) Date of Patent: Sep. 23, 2025

(54) METHOD FOR CAPTURING THE SURROUNDINGS USING AT LEAST TWO INDEPENDENT IMAGING SURROUNDINGS CAPTURE SENSORS, APPARATUS FOR PERFORMING THE METHOD, VEHICLE AND APPROPRIATELY DESIGNED COMPUTER PROGRAM

(71) Applicant: ZF CV Systems Europe BV, Brussels (BE)

(72) Inventors: Richard Matthaei, Hameln (DE); Kannan Shanthi Anbarasu, Hannover (DE); Adrian Costache, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 400 days.

(21) Appl. No.: 18/002,488

(22) PCT Filed: Jun. 29, 2021

(86) PCT No.: PCT/EP2021/067790
§ 371 (c)(1),
(2) Date: Dec. 20, 2022

(87) PCT Pub. No.: WO2022/002901
PCT Pub. Date: Jan. 6, 2022

(65) Prior Publication Data
US 2023/0334836 A1     Oct. 19, 2023

(30) Foreign Application Priority Data

Jul. 1, 2020  (DE) ..................... 10 2020 117 340.7

(51) Int. Cl.
*G06V 20/58* (2022.01)
*G06T 7/11* (2017.01)
(Continued)

(52) U.S. Cl.
CPC .............. *G06V 20/58* (2022.01); *G06T 7/11* (2017.01); *G06V 10/776* (2022.01); *G06V 10/80* (2022.01);
(Continued)

(58) Field of Classification Search
None
See application file for complete search history.

(56) References Cited

U.S. PATENT DOCUMENTS

2012/0106786 A1* 5/2012 Shiraishi ............... G01S 17/931
382/103
2015/0346059 A1* 12/2015 Gordon ................. G01M 15/14
701/99
(Continued)

FOREIGN PATENT DOCUMENTS

CN     105973619 A    9/2016
CN     108151806 A    6/2018
(Continued)

OTHER PUBLICATIONS

Kang et al., "Camera and Radar Sensor Fusion for Robust Vehicle Localization via Vehicle Part Localization," Published in IEEE Access Apr. 29, 2020, DOI: 10.1109/ACCESS.2020.2985075 (Year: 2020).*

(Continued)

*Primary Examiner* — Soo Shin
(74) *Attorney, Agent, or Firm* — LEYDIG, VOIT & MAYER, LTD.

(57) ABSTRACT

A method for environment perception with at least two independent imaging environment perception sensors, including analyzing images from the environment perception sensors by respective object detection algorithms, performing object detection repeatedly in succession for the respective environment sensors for dynamic object detec- (Continued)

tion, entering the object detections together with position information in one or more object lists, correlating the object detections in the one or more object lists with one another, increasing an accuracy of object localizations by sensor fusion of the correlated object detections, determining a reliability region regarding each object detection by at least one environment perception sensor, and confining the sensor fusion of the object detections to the reliability region, wherein outside the reliability region, object localization takes place on the basis of the object detections by the at least one environment perception sensor to which the determined reliability region does not apply.

19 Claims, 6 Drawing Sheets

(51) Int. Cl.
    *G06V 10/776* (2022.01)
    *G06V 10/80* (2022.01)
(52) U.S. Cl.
    CPC .. *G06V 20/582* (2022.01); *G06T 2207/30252* (2013.01)

(56) References Cited

U.S. PATENT DOCUMENTS

| | | | |
|---|---|---|---|
| 2016/0142160 A1* | 5/2016 | Walker | H04L 67/12 |
| | | | 702/104 |
| 2016/0162743 A1* | 6/2016 | Chundrlik, Jr. | G06T 7/277 |
| | | | 348/148 |
| 2016/0170414 A1 | 6/2016 | Chen et al. | |
| 2017/0190337 A1* | 7/2017 | Singh | B60K 35/26 |
| 2019/0023267 A1 | 1/2019 | Takagi et al. | |
| 2019/0258878 A1* | 8/2019 | Koivisto | G06V 10/46 |
| 2019/0377086 A1 | 12/2019 | Rogan | |
| 2020/0074212 A1* | 3/2020 | Amano | G06V 10/26 |
| 2021/0018590 A1* | 1/2021 | Grau | G06F 18/22 |
| 2021/0044612 A1* | 2/2021 | Kawauchi | B60W 50/0225 |
| 2021/0215794 A1 | 7/2021 | Breddermann et al. | |
| 2021/0229683 A1* | 7/2021 | Aoyagi | B60W 60/0018 |
| 2025/0093163 A1* | 3/2025 | Zhang | G01C 21/20 |
| 2025/0095344 A1* | 3/2025 | Eidehall | G06V 20/70 |

FOREIGN PATENT DOCUMENTS

| | | |
|---|---|---|
| DE | 102018117137 A1 | 1/2019 |
| DE | 102019115611 A1 | 12/2019 |
| DE | 102018123779 A1 | 3/2020 |

OTHER PUBLICATIONS

Zhao et al., "Detection and tracking of pedestrians and vehicles using roadside LiDAR sensors," Transportation Research Pact C 100 (2019) 68-87 (Year: 2019).*
Wang et al., "Monocular based road vehicle detection with feature fusion and cascaded Adaboost algorithm," Optik 126 (2015) 3329-3334 (Year: 2015).*
Mathworks. Track-Level Fusion of Radar and Lidar Data. R2020a Documentation. [online], [retrieved on Nov. 10, 2021]. Retrieved from the Internet <URL: https://nl.mathworks.com/help/releases/R2020a/fusion/examples/track-level-fusion-of-radar-and-lidar-data.html>.
International Standard ISO 11898-1, Road Vehicles-Controller area network (CAN), Part 1: data link layer and physical signaling, Dec. 2015, pp. i-3, Geneva, Switzerland.
SAE International J3016, Surface vehicle recommended practice, Taxonomy and Definitions for Terms Related to Driving Automation Systems for On-Road Motor Vehicles, Jun. 2018, pp. 1-35, USA.

* cited by examiner

METHOD FOR CAPTURING THE SURROUNDINGS USING AT LEAST TWO INDEPENDENT IMAGING SURROUNDINGS CAPTURE SENSORS, APPARATUS FOR PERFORMING THE METHOD, VEHICLE AND APPROPRIATELY DESIGNED COMPUTER PROGRAM

CROSS REFERENCE TO RELATED APPLICATIONS

This application is a U.S. National Phase application under 35 U.S.C. § 371 of International Application No. PCT/EP2021/067790, filed on Jun. 29, 2021, and claims benefit to German Patent Application No. DE 10 2020 117 340.7, filed on Jul. 1, 2020. The International Application was published in German on Jan. 6, 2022 as WO 2022/002901 A1 under PCT Article 21(2).

FIELD

The invention relates to the technical field of systems for environment perception, in particular for vehicles. Such systems are playing an ever increasing role in the automotive sector and are employed both for autonomous driving systems and driver assistance systems. The relevant driver assistance systems and automatic driving functions likewise have a level of autonomy and are reliant on the environment perception sensors to produce reliable data.

BACKGROUND

Work is currently being carried out intensively on technologies intended to facilitate autonomous driving in the future. An initial approach here is the introduction of various driver assistance systems which relieve the driver of certain tasks. Examples of driver assistance systems are a blind spot assistant, an emergency braking assistant, a parking assistant, a turning assistant, a lane keep assistant, a speed regulating assistant, etc. In this context is also mentioned fully autonomous driving, in which a fully autonomous driving function is implemented using a suitably powerful computer.

Implementing these systems requires collecting comprehensive information about objects (in particular moving road-users but also static objects such as road signs) in the visible and hidden/invisible surroundings of the subject vehicle. The system makes this possible by employing newer technologies (vehicle-to-vehicle communication, use of databases, backend connectivity, Cloud services, server deployment, vehicle sensors, etc.). In the field of vehicle sensors, components that facilitate monitoring of the surroundings are in particular RADAR devices (Radio Detection and Ranging), LIDAR devices (Light Detection and Ranging), mainly for the field of distance sensing/warning, and cameras with suitable image processing for the field of object detection. All three sensor types are imaging environment perception sensors. Object detection can be performed by image analysis. The data about the environment obtained in this way can hence be used as the basis for driver advice, warnings, automatic driving maneuvers, etc. by the system. Thus, for example, indicators/warnings are conceivable about the direction (possibly in the subject trajectory) in which another vehicle in the surrounding area intends to turn. For example, an automatic braking maneuver can be performed if an adaptive speed warning assistant ascertains that the distance from a vehicle traveling in front is less than a certain value. In addition, road-sign detection is also mentioned as a usage case for notifying the driver of underlying legal requirements. Automatic driving systems or driver assistance systems must also take account of these road signs, which can trigger automatic braking or acceleration. An especially important example is an Advanced Emergency Braking System (AEBS). Such systems may be designed for various combinations of environment perception sensors. Custom changes are hence necessary with regard to availability of the assistance system, triggering of the various driver warnings, and the braking behavior, etc.

The following section is included here to clarify the term "autonomous driving". Autonomous driving (also sometimes called automatic driving, automated driving or piloted driving) refers to the movement by vehicles, mobile robots and driverless transport systems that behave largely autonomously. The term autonomous driving is graduated in various levels. The term autonomous driving is still used for certain levels even though a driver is in the vehicle, who possibly undertakes just the supervision of the automatic driving process. In Europe, the various transport ministries have collaborated (including involvement of the German Federal Highway Research Institute) to define the following levels of autonomy.

Level 0: "Driver only"; the driver is driving, and steers, accelerates, brakes, etc. An emergency braking function may also intervene at this level.

Level 1: certain assistance systems help to operate the vehicle (including an Automatic Cruise Control ACC system).

Level 2: partial automation. The assistance systems (including traffic jam assistant) take on automatic parking, lane-keeping function, general longitudinal driving, acceleration, braking, etc., amongst others.

Level 3: high automation. The driver does not have to supervise the system continuously. The vehicle independently performs functions such as actuating the indicators, lane-changing and lane-keeping. The driver can attend to other things, but when required is prompted by the system within an advance warning time to assume control. This form of autonomy is technically feasible on freeways. The legislature are working towards approval of Level 3 vehicles. The legal framework is already in place for this.

Level 4: full automation. The system assumes permanent control of the vehicle. If the system is no longer managing to perform the driving tasks, the driver can be prompted to assume control.

Level 5: no driver required. Apart from specifying the destination and starting the system, no human intervention is required.

Automated driving functions at level 3 and above take the responsibility for controlling the vehicle away from the driver. The VDA (German Association of the Automotive Industry) has issued a similar classification of the various levels of autonomy, which can also be used. Similarly, the Society of Automotive Engineers has a specification for classifying the levels of autonomy. This is specification "*SAE J3016™: Taxonomy and Definitions for Terms Related to On-Road Motor Vehicle Automated Driving Systems*". This specification again states that the emergency braking function may intervene at Level 0.

Based on current development towards higher levels of autonomy at which many vehicles are still controlled by the driver nonetheless, it can be assumed that relevant additional information can be used already in the medium term for manually controlled vehicles rather than just in the long term for highly automated systems.

A very important aspect in this context is that the environment of the moving vehicle must be perceived with high accuracy. One approach here is that of sensor data fusion, in which the accuracy of the environment perception is increased by correlating the object detections by a plurality of different environment perception sensors, thereby resulting in fused data. For example, sensor data fusion may consist in the fusion of camera data and radar data in order to classify objects and increase the object detection performance of the sensor system.

US 2016/0170414 A1 discloses a vehicle-based system for detecting road signs. This employs environment sensors such as a LIDAR sensor, RADAR sensor and camera. The position of the vehicle is also captured by GPS. The detected road signs together with their position are reported to the outside, where they are entered in a database.

The known solutions have various disadvantages. The image acquisition methods known today for use in the driver assistance sector have the problem that their detection performance decreases if an environment sensor is supplying unreliable data, for instance because of the ambient conditions. This can happen quickly. The ambient conditions also include the weather conditions. These have a strong impact on the visibility conditions. Daylight is also mentioned in this connection. At dusk, during rain, fog and at night time, it may no longer be possible to use the images captured by the camera so well for object detection. The boundaries here are fluid.

Thus there is a need for further improvements in environment perception systems, in particular in vehicle-based environment perception sensors which must detect objects as reliably as possible.

SUMMARY

In an embodiment, the present disclosure provides a method for environment perception with at least two independent imaging environment perception sensors, comprising analyzing images from the environment perception sensors by respective object detection algorithms, wherein the at least two environment perception sensors have different characteristics with regard to object detection as a function of a distance of an object from the respective environment perception sensor, performing object detection repeatedly in succession for the respective environment sensors for dynamic object detection, entering the object detections together with position information in one or more object lists, correlating the object detections in the one or more object lists with one another, increasing an accuracy of object localizations by sensor fusion of the correlated object detections, determining a reliability region regarding each object detection by at least one environment perception sensor, and confining the sensor fusion of the object detections to the reliability region, wherein outside the reliability region, object localization takes place on the basis of the object detections by the at least one environment perception sensor to which the determined reliability region does not apply.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides an approach in which the technology of sensor data fusion is used as extensively as possible, because it has been proven to increase the accuracy in object detection. In an embodiment, this is achieved by a method for environment perception using at least two independent imaging environment perception sensors including, in addition to cameras, also RADAR and LIDAR sensors, by an apparatus for performing the method, by a vehicle for use in the method, and by a computer program.

In an embodiment, a reduction in the functional accuracy of the driver assistance system occurs if an environment perception sensor is exposed to adverse conditions even though another environment perception sensor is not negatively affected. In particular, it was also discovered that, despite employing sensor data fusion, the functional accuracy may be impaired if one of the environment perception sensors is exposed to adverse conditions. It is therefore provided according to an embodiment of the invention to monitor the functioning of the environment perception sensors.

In one form, an embodiment of the invention includes a method for environment perception using at least two independent imaging environment perception sensors, wherein the images from the environment perception sensors are analyzed by respective object detection algorithms. Said at least two environment perception sensors have different characteristics with regard to object detection as a function of the distance of the object from the environment perception sensor. Since the environment perception sensors are moving, object detection is performed repeatedly in succession for the respective environment sensors for the purpose of dynamic object detection. The repeated successive object detections are entered in an object list, wherein the object detections in the object lists of the environment perception sensors are correlated with one another. The accuracy of the object detections of the correlated object detections is increased by means of sensor data fusion. In addition, however, the functioning of the environment perception sensor is monitored because of the aforementioned problem. This is done in the form of determining a reliability region regarding the object detection by at least one environment perception sensor. If it is identified for an environment perception sensor that its functioning is impaired compared with the normal functioning, and that it is providing reliable object detections only in a smaller region than the nominal region, performing the sensor fusion of the object detections is confined just to the reliability region, and, outside the reliability region, object localization takes place on the basis of the object detections by the other environment perception sensor, to which the determined reliability region does not apply. Using the results from the sensor data fusion is therefore suspended in the region outside the reliability region. The method has the advantage that the accuracy of the object detections by the environment perception sensors is increased overall. This is achieved in that the sensor data fusion is inhibited in the regions where one of the environment perception sensors is not delivering reliable object detections, and instead the object detections by the other environment perception sensor are adopted. Thus the sensor data fusion between reliable and unreliable object detections does not result in falsification of object detections.

It is advantageous here if, for the purpose of determining the reliability region, the historical data from previous object detections is taken into account, and an object detection rate over the distance between environment sensor and object is calculated.

Similarly, It is advantageous if, for the purpose of determining the reliability region, the historical data from previous object detections is taken into account, and an object tracking rate over the distance between environment sensor and object is calculated. Both rates form a simple criterion that can be used to specify quantitatively the reliability region.

This can be done advantageously by determining the reliability region such that in this region the object detection rate and/or the object tracking rate lies in a nominal value range that is required for reliable object detection. The nominal value range can be established by experiments. An example of a required nominal value range lies in the range of 80-90% for object detection rate and 90-100% for object tracking rate.

An advantageous variant consists in continuously redetermining the reliability region in order to facilitate dynamic specification of the reliability region. This makes it possible to adapt quickly to changing ambient conditions, for instance changing light conditions or changing weather conditions. This also makes it possible to adapt dynamically the control behavior of the driver assistance system or of the automatic driving function. This can relate to various aspects of the driver assistance system. Other examples apart from the control behavior are also the availability of the driver assistance system and the type of warning to the driver.

The method can be used particularly advantageously in environment perception sensors for environment perception for a vehicle, wherein the one environment perception sensor is a RADAR sensor or a LIDAR sensor and the other environment perception sensor is a camera.

The environment sensors in this case perceive moving road-users, in particular vehicles traveling in front, as the objects.

In addition, it is advantageous if the environment sensors also perceive non-moving objects, in particular traffic signs or stationary vehicles, as the objects. These objects are extremely important for safe driver assistance systems and levels of automatic driving.

It is advantageous here if, for the purpose of object tracking, a trajectory is ascertained on which the positions of the continuous object detections of the object lie. Ascertaining the trajectory is advantageous for controlling the sensor data fusion. The reliability region is namely dependent on the object and the location of the object relative to the sensor.

Said trajectory can be divided into segments which indicate from which environment perception sensor or sensors the measurement data is meant to be used for the actual calculation of the position of an object detection. Thus there are regions in which an improvement in the accuracy of the object detection occurs by sensor data fusion of corresponding object detections by both environment perception sensors, and regions for which only the object detections by one environment perception sensor are used.

In an embodiment, the invention relates to an apparatus for performing the method, comprising at least two independent imaging environment perception sensors, wherein the at least two environment perception sensors have different characteristics with regard to object detection as a function of the distance of the object from the environment perception sensor. The apparatus also contains a processing facility and a memory facility, wherein the processing facility is designed to calculate by sensor fusion an accurate position for object detection by the at least two imaging environment perception sensors. A particular feature consists in that the processing facility is designed to determine dynamically a reliability region regarding the object detection by at least one environment perception sensor, and to confine performing the sensor data fusion for the corresponding object detections by the at least two environment perception sensors to the reliability region, and, outside the reliability region, to calculate the object localization on the basis of the object detections by the other environment perception sensor, to which the determined reliability region does not apply. The method according to embodiments of the invention can thus be implemented in an apparatus.

Particularly advantageously, a processing facility of this type may be deployed as part of a control unit in a driver assistance system of a vehicle. Such driver assistance systems rely on receiving reliable object detections from the environment perception sensors. The apparatus and the method according to embodiments of the invention can be used to check the reliability of the object detections and to increase the accuracy of the object detections in certain regions.

An advantageous development of the apparatus consists in the processing facility being with a degradation function designed to adapt the functioning of the driver assistance system dynamically according to the determination of the reliability region. For example, this can be done by adapting the control behavior. This can go as far as a complete shutdown of the driver assistance system. Likewise, the driver can be given graded warnings.

In an often especially important variant, the environment perception sensors consist in a video camera and a LIDAR sensor or RADAR sensor.

In an embodiment, a vehicle having an apparatus according to embodiments of the invention is provided.

In an embodiment, a computer program designed to perform the steps of the method according to embodiments of the invention when it is executed in a processing facility is provided. The corresponding advantages apply thereto as described for the method according to embodiments of the invention.

The present description illustrates the principles of the disclosure according to embodiments of the invention. It is understood that this will enable a person skilled in the art to design various arrangements which, while not described explicitly here, do embody principles of the disclosure according to embodiments of the invention, the scope of which is likewise intended to be protected.

Figure 1:
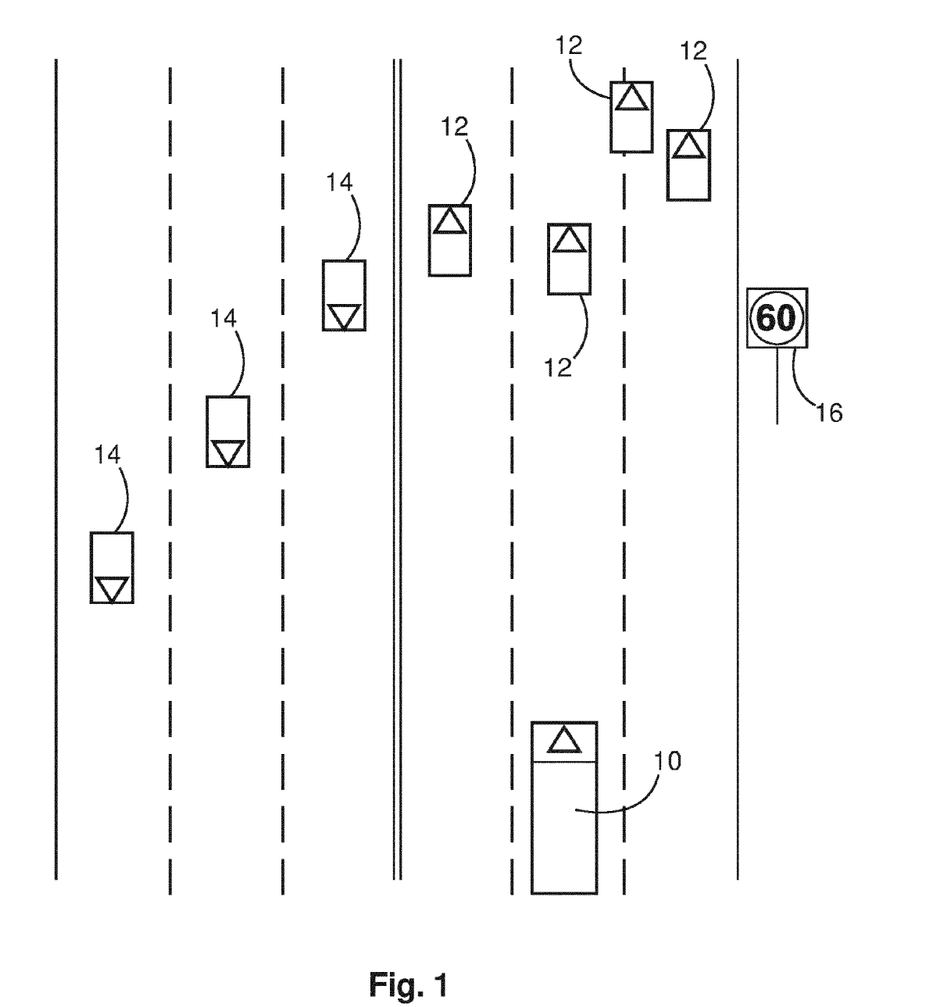
FIG. 1 shows a driving situation on a multi-lane freeway.

FIG. 1 shows a typical traffic situation on a six-lane freeway The reference number 10 denotes a utility vehicle. This may be a bus or a truck, for instance. The utility vehicle 10 is equipped with environment perception sensors and a driver assistance system, which is supported by the object detections resulting from analysis of the data from the environment perception sensors. The driver assistance system relates to an emergency braking assistance system. The reference number 12 denotes vehicles traveling in front. The utility vehicle 10 is traveling in the center lane. A road sign 16 is shown on the right-hand edge of the road. It is a speed limit sign. Oncoming vehicles 14 are traveling in the lanes of the opposite roadway. As is usual for freeways, the two roadways for the two different directions are structurally separated. This is indicated by the double line in the center.

Figure 2:
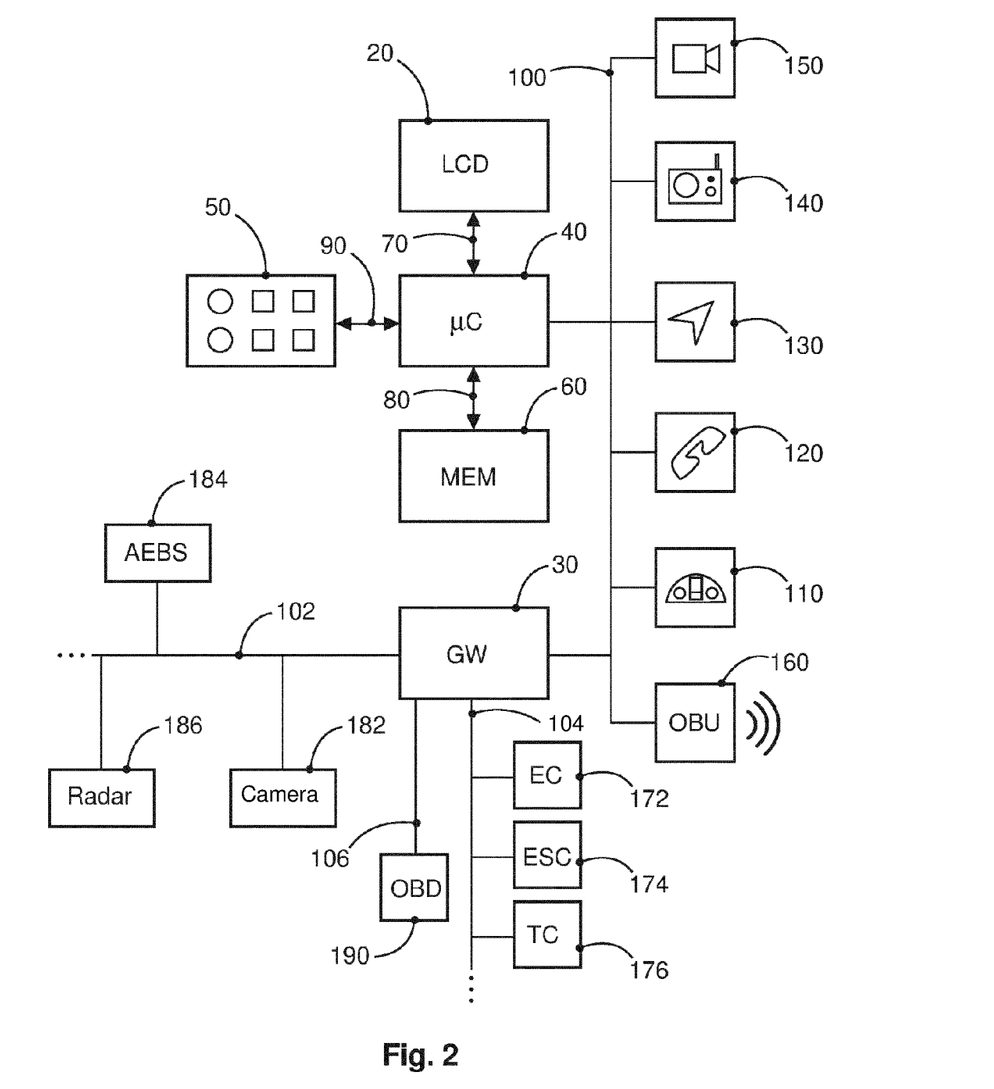
FIG. 2 is a block diagram of the on-board electronics of a vehicle.

FIG. 2 shows schematically a block diagram of the on-board electronics of the utility vehicle 10. The infotainment system of the utility vehicle 10 is shown in the top area. A touch-sensitive display unit 20, a processing facility 40, an input unit 50 and a memory 60 are used for operating the infotainment system. The display unit 20 is connected to the processing facility 40 via a data line 70. The data line may be designed in accordance with the LVDS (Low Voltage Differential Signaling) standard. The display unit 20 receives from the processing facility 40 via the data line 70 control data for controlling the display area of the touchscreen 20. Control data from the entered commands is also transferred via the data line 70 from the touchscreen 20 to the processing facility 40. The reference number 50 denotes the input unit. This includes controls such as pushbuttons, rotary controls, slide controls or rotary pushbutton controls, which the operator can use to make menu-driven inputs.

The memory facility 60 is connected to the processing facility 40 via a data line 80. In the memory 60 may be stored pictogram records and/or symbol records containing the pictograms and/or symbols potentially showing of additional information.

The other parts of the infotainment system—interior camera 150, radio 140, navigation device 130, phone 120 and instrument panel 110—are connected via the databus 100 to the apparatus for operating the infotainment system. A bus system based on Ethernet technology, for instance BroadR-Reach, is eligible as the databus 100. Further examples are the MOST bus (Media Oriented System Transport) or the D2B bus (Domestic Digital Bus). Also connected to the databus 100 is a communications module 160. This is used for internal and external communications. For that purpose, the communications module 160 is equipped with an Ethernet interface for internal communications. Also provided in the communications module 160 is an LTE (Long Term Evolution) or 5G modem, by means of which data can be received and sent via mobile communications. For example, segments of a continuously updated high-accuracy map can be loaded via mobile communications. It is also mentioned here that the interior camera 150 can be designed as a conventional video camera. In this case, it captures 25 frames/s, which corresponds to 50 fields/s for the interlaced capture mode.

The reference number 172 denotes an engine control unit. The reference number 174 corresponds to an ESC control unit (Electronic Stability Control) and the reference number 176 denotes a transmission control unit. Further control units, for instance an additional braking control unit, may be present in the utility vehicle 10. Such control units are typically interconnected by the CAN bus system (Controller Area Network) 104, which is standardized as an ISO standard, usually as ISO 11898-1.

The communications bus 100 of the infotainment system is connected to a gateway 30. Also connected thereto are the other parts of the on-board electronics. One of these is the communications bus 104 for the drive chain, but also the communications bus 102 for driver assistance systems, which bus may be in the form of the FlexRay bus. An emergency braking assistant 184 is shown here. The international term for this emergency braking assistant is an Advanced Emergency Braking System (AEBS). Further driver assistance systems could also be connected thereto, however, including, for instance, an ACC control unit for adaptive cruise control, and a DCC driver assistance system for dynamic chassis control. Also connected to this bus 102 are the environment perception sensors: a RADAR sensor 186 (Radio Detection and Ranging) and a front camera 182. More details of their function are given below. Also connected to the gateway 30 is a communications bus 106. This connects the gateway 30 to an on-board diagnostics interface 190. The task of the gateway 30 consists in making the format conversions for the various communications systems 100, 102, 104, 106 so that data can be interchanged. In the exemplary embodiment shown, the emergency braking assistance system 184 makes use of a high-accuracy map of the surroundings for the emergency braking function. The map of the surroundings can be stored in advance in a memory of the emergency braking assistance system. For this purpose, it is typically loaded via the communication module 160, forwarded by the gateway 30 and written into the memory of the emergency braking assistance system 184. In another variant, only a segment of a map of the surroundings is loaded and written into the memory of the emergency braking assistance system. The observations by the environment perception sensors 182 and 186, however, must also be added to the loaded map of the surroundings.

There are yet more environment sensors that are able to perceive the environment of the vehicle, and are to be used for different distances and different purposes. The following ranges and purposes roughly apply:

A stereo camera, range 500 m, used for capturing a 3D map, utilized for an automatic emergency braking assistant, lane-change assistant, for road-sign detection and adaptive cruise control.

Camera, range 100 m, used for capturing a 3D map, utilized for an automatic emergency braking assistant, lane-change assistant, for road-sign detection, adaptive cruise control, for front impact warning, automatic control of lights and a parking assistant.

Ultrasound sensor, range<10 m, parking assistant.

Radar sensor, range 20 cm to 100 m, utilized for an automatic emergency braking assistant, for automatic speed regulation, adaptive cruise control, blind-spot assistant, cross-traffic alert system.

Lidar sensor, range 100 m, used for capturing a 3D map, utilized for an automatic emergency braking assistant.

The front camera 182 can be implemented as a special camera that captures more images/s in order to increase the accuracy of object detection for faster-moving objects.

The front camera 182 is used mainly for object detection. Typical objects that are meant to be detected are road signs, vehicles travelling in front/located in the surroundings/parking and other road users, junctions, turn-offs, potholes, etc. The image analysis is performed in the processing unit of the emergency braking assistant 184. Known object detection algorithms can be used for this purpose.

The object detection algorithms are executed by the processing unit of the emergency braking assistant 184. The number of images that can be analyzed per second depends on the performance of the processing unit.

Figure 3:
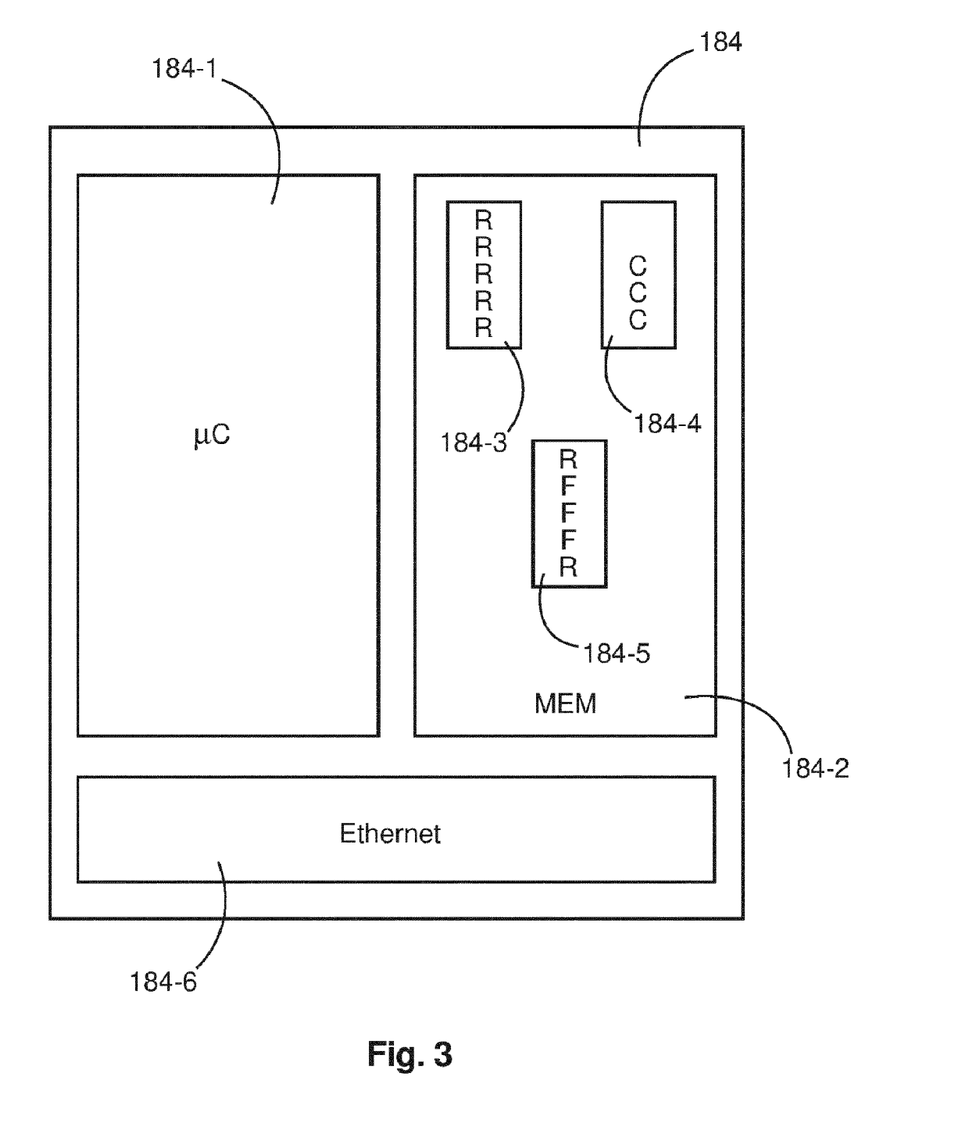
FIG. 3 is a block diagram of a control unit of an emergency braking assistance system of a vehicle.

FIG. 3 shows a block diagram of the emergency braking assistant control-unit 184. The reference number 184-1 denotes a processing unit. It is a powerful processing unit that is capable of performing the processing operations needed for the aforementioned sensor data fusion. For that reason, it may be equipped with a plurality of processing cores for performing parallel processing operations. The reference number 184-2 denotes a memory unit This may contain a plurality of different memory chips, including RAM memory, EEPROM memory and FEPROM memory. The reference number 184-6 denotes an Ethernet interface. This is used to establish the connection to the communications bus 102. The reference number 184-3 denotes an object list in which are recorded the successive object detections of an object detected by the RADAR sensor 186. This object list is received from the RADAR sensor 186 via the communications bus 102. The reference number 184-4 denotes an object list in which are recorded the successive object detections of an object detected by the camera sensor 182. Again, this object list is received from the camera sensor 182 via the communications bus 102. Both object lists 184-3 and 184-4 relate to the same object that is being monitored simultaneously by the two different environment perception sensors 182, 186. The reference number 184-5 denotes a resultant object list in which sensor data fusion has increased the accuracy of the object localization.

Figure 4:
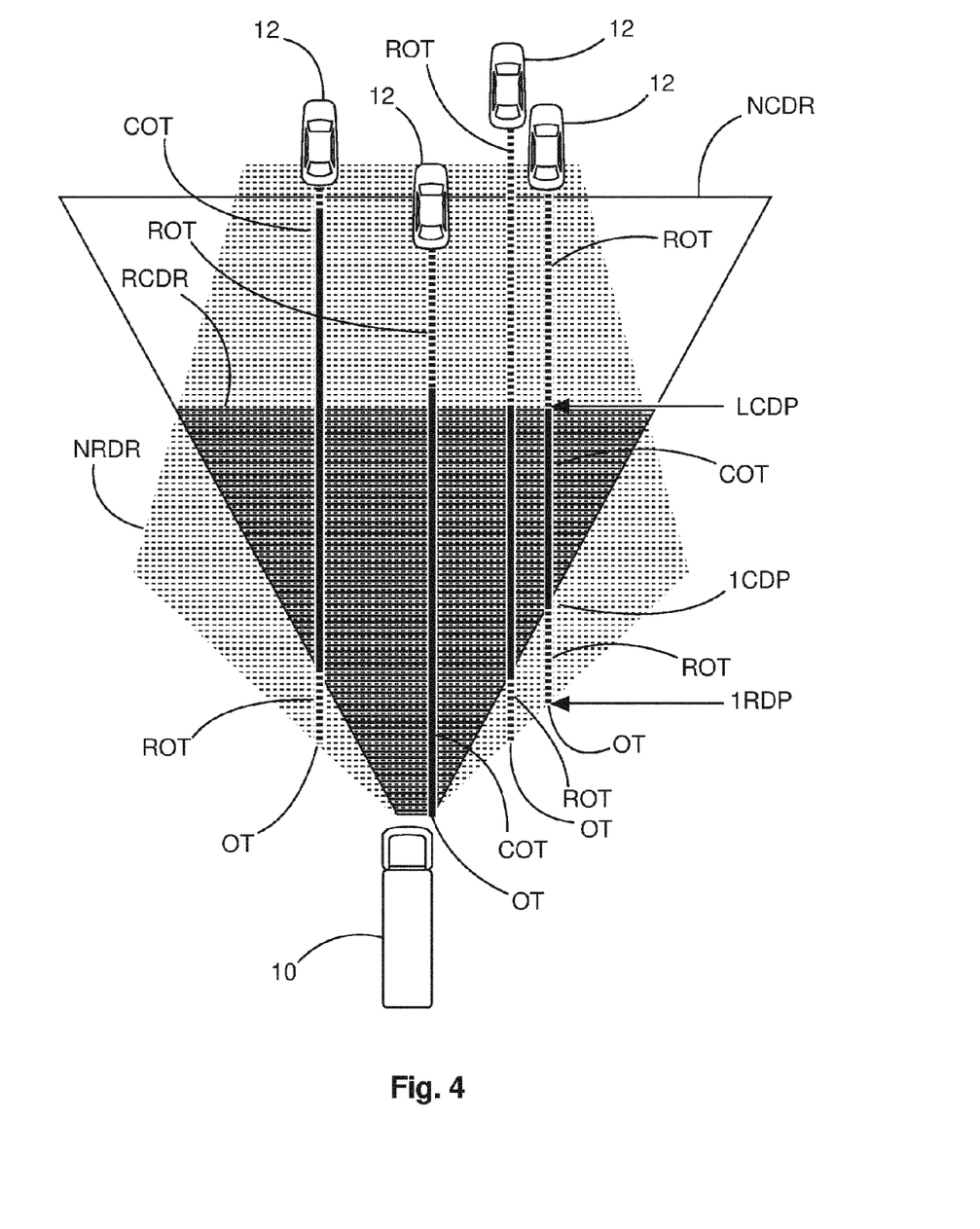
FIG. 4 is a schematic diagram depicting the object tracking traces for different vehicles traveling in front and the instantaneous reliability region for a camera sensor.

FIG. 4 shows a schematic diagram of the environment perception by the utility vehicle 10. The strengths of the RADAR sensor 186 lie in distance measurement and object detection at night time, whereas the strengths of the front camera 182 lie in object detection in daylight. FIG. 4 depicts the nominal object detection regions. The nominal object detection region of the front camera 182 is labeled with reference sign NCDR. The nominal object detection region of the RADAR sensor 186 is labeled with reference sign NRDR. Nominally, under ideal conditions, the object detection region of the front camera 182 extends almost as far as the RADAR sensor 186. Under poorer conditions, the object detection region of the front camera may differ greatly from the nominal object detection region. In FIG. 4, reference sign RCDR denotes a reliability region valid at that instant for the object detection for the front camera. Knowing that sensor data fusion cannot improve the object localizations from front camera 182 and RADAR sensor 186 in the region outside the reliability region RCDR, according to embodiments of the invention the reliability region is determined, and the sensor data fusion operation is confined to this reliability region RCDR.

FIG. 4 also depicts object tracking traces for the tracked vehicles 12 traveling front. These can be used to determine the reliability region easily. This is done by dividing the object tracking traces into different segments. The segment denoted by COT relates to the portion of the object tracking trace in which it was possible to localize the vehicle 12 traveling in front using object detection algorithms applied to the image data from the front camera 182. The segment denoted by ROT relates to the portion of the object tracking trace in which it was possible to localize the vehicle 12 traveling in front using object detection algorithms applied to the image data from the RADAR sensor 186. The RADAR sensor 186 also provides object detections in the segment COT. Individual points on the object tracking trace are picked out specifically for the object tracking trace for the vehicle 12 traveling in front, which trace is shown on the right-hand image edge. The reference sign 1RDP denotes the point of the first object detection by the RADAR sensor 186. The reference sign 1CDP denotes the point of the first object detection by the front camera 182. The reference sign LCDP denotes the point of the last object detection by the front camera 182 under the given ambient conditions. In the case of the object tracking trace on the left-hand image edge, the COT segment is significantly longer and extends closer to the end of the nominal object detection region NCDR. The reason for this might be that the vehicle 12 traveling in front is larger or has a different shape that can be detected better. It would also be possible, however, that visibility is better in this direction, for instance because there is less mist there, or because there is no shadow cast in this direction.

For determining the reliability region RCDR, an object detection rate and an object tracking rate along the object tracking trace are calculated over the distance between environment sensor and object. Both rates form a simple criterion that can be used to specify quantitatively the reliability region.

This can be done advantageously by determining the reliability region RCDR such that in this region the object detection rate and/or the object tracking rate lies in a nominal value range that is required for reliable object detection. The nominal value range can be established by experiments. An example of a required nominal value range lies in the range of 80-90% for object detection rate and 90-100% for object tracking rate.

An advantageous variant consists in continuously redetermining the reliability region RCDR in order to facilitate dynamic specification of the reliability region RCDR. This makes it possible to adapt quickly to changing ambient conditions, for instance changing light conditions or changing weather conditions.

Figure 5:
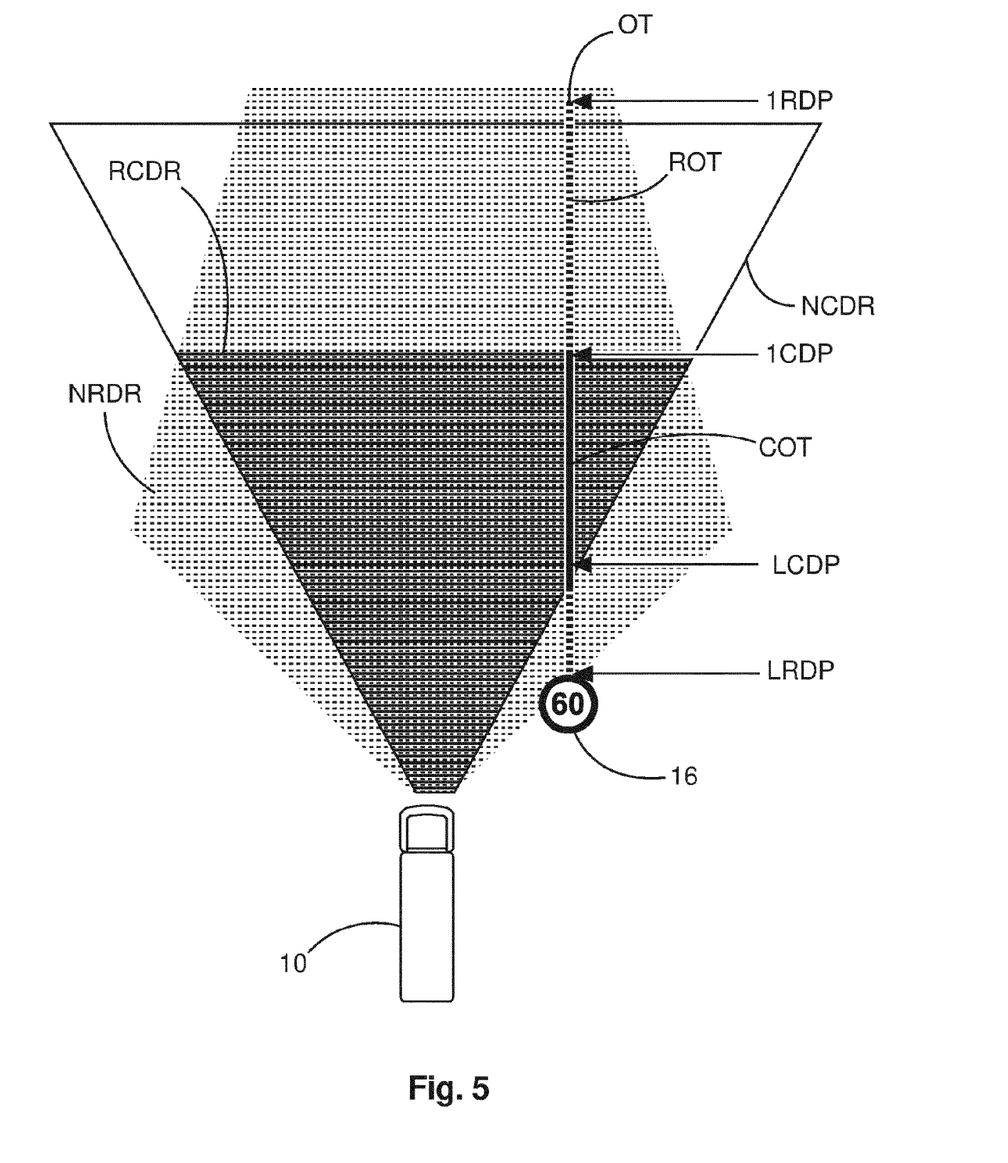
FIG. 5 is a schematic diagram depicting an object tracking trace for a static object in the form of a road sign and the instantaneous reliability region for a camera sensor.

FIG. 5 shows a schematic diagram of the environment perception by the utility vehicle 10, in which a static object in the form of a road sign 16 is tracked as the object. In FIG. 5, the same reference signs denote the same components as in FIG. 4. One difference is that the first object detection at the point 1RDP by the RADAR sensor 186 occurs when the road sign 16 is farthest away. Subsequently, the road sign 16 moves in the captured image towards the utility vehicle 10 because the utility vehicle 10 is moving towards the road sign 16. The same situation would also result when detecting dynamic objects if the utility vehicle 10 is getting closer to these. A typical situation in which the emergency braking assistant is meant to be activated relates to the example of the utility vehicle 10 driving up to the end of a traffic jam. Then also the first object detection would take place at the farthest end of the object detection region NCDR and NRDR, and the last detection close to the utility vehicle 10.

Figure 6:
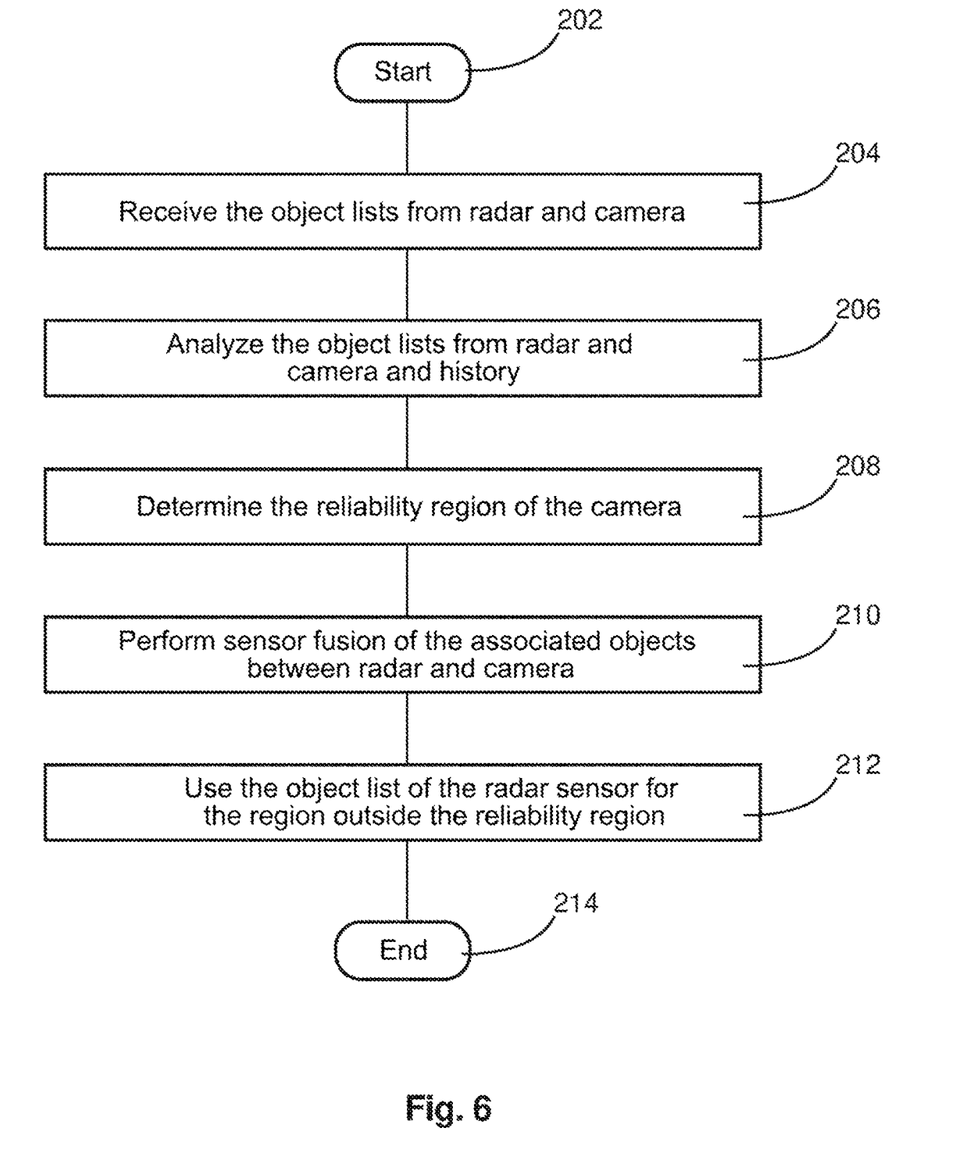
FIG. 6 is a flow diagram for a computer program used to implement a method for environment perception using at least two independent imaging environment perception sensors.

FIG. 6 shows a flow diagram which can be used to perform the method according to embodiments of the invention for environment perception using at least two independent imaging environment perception sensors 182, 186. The program is executed by the processing unit 184-1 in the control unit of the emergency braking assistant 184. The reference number 202 denotes the program start. In program step 204, the object lists 184-3 and 184-4 are received. In each of the object lists is also given the position of the detected object. Therefore the image analyses take place in the environment perception sensors 182 and 186 themselves. In another embodiment, the image data can be transferred to the emergency braking assistant 184, in which case the image analyses must then be performed in the processing unit 184-1. The image analysis involves typical object detection algorithms, which perform pattern recognition on the basis of patterns stored in a table. All valid road signs are known of course, and their patterns can be stored in a table. The pattern recognition is typically improved by a convolution operation in which the captured images are convolved with the known patterns. Such algorithms are known to a person skilled in the art and are available. If a road sign has been detected in this manner, the detection distance to the road sign is also ascertained and stored. Corresponding algorithms exist for object detection in the case of moving objects.

In program step 206, the object detections are correlated with one another. From the positions in the object lists 184-3 and 184-4, it is also possible to calculate in each case the distances of the objects 12, 16 from the environment perception sensor 182, 186. Thereby, and by means of the time instants at which the respective images were captured, it is possible to associate the object detections in the two object lists 184-3, 184-4 with one another. Statistical methods, for instance calculating the covariances between object detections, can also be used to ascertain whether the object detections correspond.

In program step 208, the received object lists 184-3 and 184-4 are analyzed. The history of the object lists which is still stored in the memory 184-2 can also be used for this purpose. The analysis aims to cross-check whether the two object lists 184-3 and 184-4 correspond. At points where the object lists do not correspond, the analysis shows which of the two sensors has provided object detection, and which has not. It can be seen in FIG. 3 that the object list 184-4 for the front camera 182 contains the object only three times, whereas the object list 184-3 for the RADAR sensor 186 contains the object five times. This is understandable because, as described, in poor visibility conditions, object detection using the data from the front camera 182 is more likely to fail than with the RADAR sensor 186. Thus it is then possible to determine the reliability region RCDR of the front camera 182. This is obtained, for example, from the object detections in the two object lists for comparison coinciding in the reliability region within a certain tolerance.

In the program step 210, the operation then takes place of sensor data fusion of the corresponding object detections in the reliability region RCDR of the front camera 182. Outside the reliability region RCDR, the object detections by the RADAR sensor 186 are entered in the fused object list 184-5. This takes place in program step 212. The result is a joint object list 184-5 for a detected object. The object may be, for example, the vehicle traveling in front 12, or the traffic sign 16, as shown in FIGS. 4 and 5. The joint object list 184-5 is used by the control program of the emergency braking assistant 184. In the joint object list 184-5, the letter F indicates which objects in the object list were determined by sensor data fusion. The letter R indicates which objects were determined solely from the data from the RADAR sensor 186. If it is detected that the object is approaching the utility vehicle 10 too far and/or too quickly, emergency braking is performed to prevent a collision with the object.

GNSS signals and odometry signals available in the utility vehicle can be used to assist in finding the position of the objects. The image quality will vary greatly with the time of day. A distinction should be drawn here between daytimes and night times.

The traffic conditions can also affect the accuracy of the object detection. In this case, the vehicle can be categorized as moving in urban traffic, on the freeway, on a country road, etc. In urban traffic, the traffic signs are perceived particularly accurately, All examples mentioned herein, as well as the necessary wording, shall be interpreted without restriction to such specifically stated examples. Thus a person skilled in the art will recognize, for example, that the block diagram shown here represents a conceptual view of an example circuit arrangement. Similarly, it is evident that a depicted flow diagram, state transition diagram, pseudocode and the like constitute different variants for representing processes that can be stored essentially in computer-readable media and thus executed by a computer or processor. The object mentioned in the claims may also explicitly be a person.

It should be understood that the proposed method and the associated apparatuses can be implemented in various forms of hardware, software, firmware, special processors or a combination thereof. Special processors may include application-specific integrated circuits (ASICs), Reduced Instruction Set Computers (RISC), and/or Field Programmable Gate Arrays (FPGAs). Preferably, the proposed method and the apparatus are implemented as a combination of hardware and software. The software is preferably installed as an application program on a program storage device. Typically, this is a machine based on a computer platform that has hardware such as one or more central processing units (CPUs), a direct access memory (RAM), and one or more input/output (I/O) interface(s). An operating system is also typically installed on the computer platform. The various processes and functions described herein can be part of the application program or a part that runs via the operating system.

The disclosure is not restricted to the exemplary embodiments described here. There is room for various adjustments and modifications that a person skilled in the art would consider based on his knowledge and in association with the disclosure.

Embodiments of the invention are explained in more detail in the exemplary embodiments by the example of usage in vehicles. It is pointed out here that usage is also possible in aircraft and helicopters, for instance during landing maneuvers or search operations, etc.

Embodiments of the invention can also be used in remote-controlled devices such as drones and robots, where image analysis is very important. Other possible usages relate to a smartphone, a tablet computer, a personal assistant or smart-glasses.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCES PART OF THE DESCRIPTION 10 utility vehicle
12 vehicle traveling in front
14 oncoming vehicle
16 traffic sign
20 LCD display
30 gateway
40 processing unit
50 input unit
60 memory unit
70 data line to the display unit
80 data line to the memory unit
90 data line to the input unit
100 1st communications bus
102 2nd communications bus
104 3rd communications bus
106 4th communications bus
110 instrument panel
120 phone
130 navigation device
140 radio
150 interior camera
160 on-board communications module
172 engine control unit
174 ESC control unit
176 transmission control unit
182 front camera
184 emergency braking assistant control-unit
184-1 microprocessor
184-2 memory unit
184-3 object list for RADAR sensor
184-4 object list for front camera
184-5 fused object list
186 RADAR control unit
190 on-board diagnostics port
202-216 various program steps of a computer program
NCDR nominal camera object detection region
NRDR nominal RADAR-sensor object detection region
RCDR reliability region for camera sensor
COT camera object tracking trace
ROT RADAR-sensor object tracking trace
1CDP first object detection position for camera sensor
1RDP first object detection position for RADAR sensor
LCDP last object detection position for camera sensor
NCDP last object detection position for RADAR sensor

The invention claimed is:

1. A method for environment perception with at least two independent imaging environment perception sensors, comprising:
analyzing images from the environment perception sensors by respective object detection algorithms, wherein the at least two environment perception sensors have different characteristics with regard to object detection as a function of a distance of an object from the respective environment perception sensor;
performing object detection repeatedly in succession for the respective environment sensors for dynamic object detection:
entering the object detections together with position information in one or more object lists;
correlating the object detections in the one or more object lists with one another:
increasing an accuracy of object localizations by sensor fusion of the correlated object detections;
determining a reliability region regarding each object detection by at least one environment perception sensor; and
confining the sensor fusion of the object detections to the reliability region, wherein outside the reliability region, object localization takes place on the basis of the object detections by the at least one environment perception sensor to which the determined reliability region does not apply,
wherein the reliability region is smaller than an overlap region formed by overlap of an entire detection region of each of the environment perception sensors.

2. The method as claimed in claim 1, wherein historical data from previous object detections is taken into account for determining the reliability region, and an object detection rate over the distance of the object from the respective environment perception sensor is calculated along an object tracking trace.

3. The method as claimed in claim 2, wherein an object tracking rate over the distance is calculated along the object tracking trace.

4. The method as claimed in claim 2, wherein the reliability region is determined such that in the reliability region, the object detection rate along the object tracking trace lies in a predetermined nominal value range.

5. The method as claimed in claim 3, wherein the object tracking trace on which positions of continuous object detections of the object are presumed to lie is estimated for object tracking.

6. The method as claimed in claim 3, wherein the reliability region is determined such that in the reliability region, the object tracking rate along the object tracking trace lies in a predetermined nominal value range.

7. The method as claimed in claim 5, wherein the object tracking trace is divided into segments which indicate from which environment perception sensor or sensors measurement data is meant to be used for actual calculation of the position of the object detection.

8. The method as claimed in claim 1, wherein the reliability region is continuously re-determined to facilitate dynamic specification of the reliability region.

9. The method as claimed in claim 1, wherein the environment perception sensors are configured for environment perception for a vehicle, wherein at least one environment perception sensor is a RADAR sensor or a LIDAR sensor, and wherein at least one environment perception sensor is a camera.

10. The method as claimed in claim 1, wherein the environment perception sensors perceive moving road-users as the objects.

11. The method as claimed in claim 10, wherein the environment perception sensors perceive vehicles traveling in front as the objects.

12. The method as claimed in claim 1, wherein the environment perception sensors perceive non-moving objects as the objects.

13. The method as claimed in claim 12, wherein the environment perception sensors perceive traffic signs and/or stationary vehicles as the objects.

14. A non-transitory computer-readable medium having processor-executable instructions stored thereon, wherein the processor-executable instructions, when executed by one or more processors, facilitate performance of the method of claim 1.

15. An apparatus for performing the method as claimed in claim 1, comprising:
- at least two independent imaging environment perception sensors, wherein the at least two environment perception sensors have different characteristics with regard to object detection as a function of the distance of the object from the environment perception sensor;
- a processing facility and a memory facility, wherein the processing facility is designed to calculate by sensor fusion a more accurate object detection by the at least two imaging environment perception sensors, wherein the processing facility is designed to calculate for detected objects in the object lists of the environment perception sensors an associated position of the object, wherein the processing facility is configured to determine dynamically the reliability region regarding the object detection by at least one environment perception sensor, and to confine performing the sensor fusion for the corresponding object detections by the at least two environment perception sensors to the reliability region, and, outside the reliability region, to calculate the object localization on the basis of the object detections by an environment perception sensor, to which the determined reliability region does not apply,
- wherein the reliability region is smaller than an overlap region formed by overlap of an entire detection region of each of the environment perception sensors.

16. The apparatus as claimed in claim 15, wherein the processing facility is part of a controller in a driver assistance system of a vehicle.

17. The apparatus as claimed in claim 16, wherein the processing facility is configured to perform a degradation function to adapt a function of the driver assistance system dynamically according to the determination of the reliability region.

18. The apparatus as claimed in claim 15, wherein one of the at least two environment perception sensors is a video camera, and at least one other environment perception sensor is a LIDAR sensor or a RADAR sensor.

19. A vehicle, wherein the vehicle is equipped with an apparatus as claimed in claim 15.

* * * * *